United States Patent [19]

Wright et al.

[11] Patent Number: 5,332,435
[45] Date of Patent: Jul. 26, 1994

[54] HIGH BOND STRENGTH CEMENT ADDITIVES

[75] Inventors: Bruce T. Wright, Mt. Pleasant; Peter Schilling, Charleston, both of S.C.

[73] Assignee: Westvaco Corporation, New York, N.Y.

[21] Appl. No.: 151,360

[22] Filed: Nov. 12, 1993

[51] Int. Cl.⁵ ................................. C04B 24/00
[52] U.S. Cl. ........................ 106/727; 106/819; 106/823; 524/2; 524/5
[58] Field of Search ........... 106/696, 724, 727, 819, 106/823, 821; 524/2, 5

[56] References Cited

U.S. PATENT DOCUMENTS

| | | |
|---|---|---|
| 4,401,472 | 8/1983 | Gerber . |
| 4,519,842 | 5/1985 | Gerber . |
| 4,546,160 | 10/1985 | Brand et al. . |
| 4,650,522 | 3/1987 | Teraji et al. .................... 106/727 |
| 4,960,465 | 10/1990 | Arfaci .............................. 106/810 |
| 5,192,366 | 3/1993 | Nishioka et al. ................ 106/724 |

OTHER PUBLICATIONS

American Society for Testing and Materials (A.S.T.M.) Designations: C185-188 and C91-89.
Uniform Building Code (U.B.C.) Standards (1991) Nos. 24-19 and 24-30.

*Primary Examiner*—Karl Group
*Assistant Examiner*—Paul Marcantoni
*Attorney, Agent, or Firm*—Daniel B. Reece, IV; Terry B. McDaniel; Richard L. Schmalz

[57] ABSTRACT

A hydraulic cement mix including hydraulic cement, aggregate, sufficient water to effect hydraulic setting of the cement, and a polyamidoamine additive, the additive being present in an amount sufficient to increase the bonding strength of the hardened mix. Generally, the additive is present in a total amount of about 0.025 to 0.25% by weight based upon the weight of the cement, preferably in an amount in the range of about 0.075 to 0.15% by weight.

9 Claims, No Drawings

HIGH BOND STRENGTH CEMENT ADDITIVES

FIELD OF INVENTION

This invention relates to additive compounds for incorporation in hydraulic cement mixes. More particularly, this invention relates to masonry and mortar cement additives which improve mortar-to-brick bond strengths and the process for producing the same.

BACKGROUND OF THE INVENTION

Cement additives or admixtures are special chemicals which are added to a batch of cement before or during mixing to impart desired properties to the cement. The bonding strength of cement is one such property which can be augmented via the use of various additives.

The properties of a cement are also affected by its air content. For example, a high air content enhances the workability of the cement by increasing its plasticity, thus making it easier to use. However, a high air content also decreases the bonding strength of the cement. Indeed, it is common practice in the cement industry to increase a cement's bonding strength by decreasing its air content.

A need exists for additive compositions for incorporation in hydraulic cement mixes which are capable of improving a cement's bonding strength without decreasing its air content and workability.

SUMMARY OF THE INVENTION

The present invention is an additive composition or admixture for incorporation in hydraulic cement mixes for making masonry and mortar cements. In addition, the invention is also directed to these improved cement mixes which incorporate the additive composition.

For the purposes of this invention, the term "hydraulic cement" includes cementitious compositions capable of being set and hardened by the action of water (e.g., portland cements, sulphate-resisting cements, blast-furnace cements, pozzolanic cements, and high-alumina cements), since the additive composition of the present invention can be incorporated into all hydraulic cement mixes. The preferred use of the present additive is in portland cement mixes. For the purposes of this invention, the term "portland cement" includes all cementitious compositions which have a high content of tricalcium silicate and are chemically similar or analogous to portland cement (the specification for which is set forth in American Society for Testing and Materials (A.S.T.M.) specification C-150-89). This includes portland cements into which fly ash, limestone, pozzolana slag, or mixtures thereof are incorporated and portland blended cements such as those in A.S.T.M. C-595-89.

The invention comprises a hydraulic cement mix including hydraulic cement, fine aggregate (or sand), sufficient water to effect hydraulic setting of the cement, and an additive comprising the polyamidoamine product produced by reacting in a condensation reaction a styrene-acrylic acid copolymer with a polyamine (or combination of polyamines). The additive is present in a total amount of between about 0.025% and about 0.25% by weight based upon the weight of the cement, preferably in an amount in the range of about 0.075% to about 0.15% by weight.

Use of the additive is beneficial to the engineering properties of hydraulic cement mixes in that it results in products having an increased bonding strength over similar mixes prepared without the additive. For example, this product improves mortar-to-brick bond strengths by 20–30% over common tall oil-based additives at similar cement air content levels. Furthermore, the mechanism by which this additive increases the bonding strength is not the traditional one of lowering the cement's air content. Instead, this additive enhances the cement's mortar-to-brick adhesion. Thus, the invention produces cements exhibiting improved workability and plasticity when compared to equivalent bond strength cements formulated using traditional additives.

It is therefore an object of the present invention to provide improved hydraulic cement mixes.

It is another object of this invention to provide improved hydraulic cement mixes which include an additive composition which will advantageously increase the bonding strength of the hardened cement mix.

These and other objects of the present invention will be readily apparent to those skilled in the art from the following detailed description and claims of the instant application.

DESCRIPTION OF THE PREFERRED EMBODIMENTS

In the practice of the present invention, a polyamidoamine is incorporated in hydraulic cement mixes for making masonry and mortar cements in amounts sufficient to increase the bonding strength of the hardened hydraulic cement mix.

The cement additive is produced by first reacting (in a polymerization reaction) styrene, α-methyl styrene, or combinations thereof with acrylic acid to form a styrene-acrylic acid copolymer. This copolymer is subsequently reacted (in a condensation reaction) with a polyamine (or combination of polyamines) dissolved in a polyglycol solvent to form the polyamidoamine cement additive composition. These reactions and the additive composition are represented in FIG. 1 below.

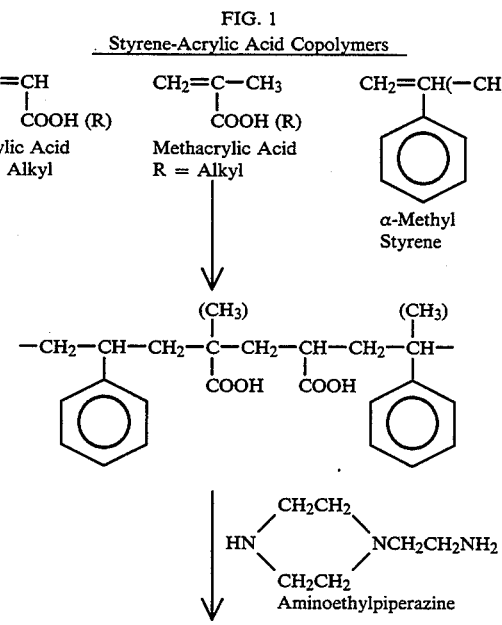

FIG. 1
Styrene-Acrylic Acid Copolymers

-continued
FIG. 1
Styrene-Acrylic Acid Copolymers

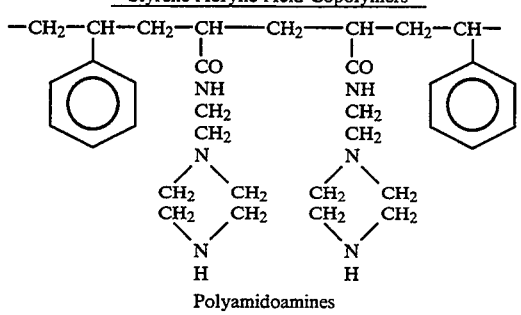

Polyamidoamines

The ratio of styrene, α-methyl styrene, or combinations thereof to acrylic acid required to yield the desired styrene-acrylic acid copolymers ranges from about 1:1 to 3:1. These copolymers are produced by heating in the presence of a suitable radical initiator the desired mixture of styrene, α-methyl styrene, or combinations thereof and acrylic acid to a temperature in the range of about 180°–270° C. for a time sufficient for the polymerization reaction to occur (usually about 1 to 20 minutes). (This type of polymerization reaction is described in U.S. Pat. No. 4,546,160 to Brand et al., which is hereby incorporated by reference.) Styrene-acrylic acid copolymers suitable for use in the invention have molecular weights in the range of about 1,000 to 10,000.

The ratio of styrene-acrylic acid copolymer to polyamine required to produce the desired polyamidoamine cement additives ranges from about 1:1 to 2.5:1. These additives are obtained by heating the desired mixture of styrene-acrylic acid copolymer and polyamine to a temperature in the range of about 180°–260° C. for a time sufficient for the condensation reaction to occur (commonly about 2 to 8 hours).

Radical initiators suitable for use in the above polymerization reactions include heat sensitive organic peroxide and azo compounds, and the like.

Polyamines which are suitable for use in the invention have a molecular weight in the range of 60–1,000, and include any amine capable of forming an amidoamine when reacted with a copolymer. These include, but are not limited to, the following: aminoethylethanolamine, aminoethylpiperazine, diethylenetriamine, triethylenetetramine, tetraethylenepentamine, bis-aminopropylamine, pentamethylenediamine, hydroxyethylpiperazine, bis-hexamethylene triamine and higher molecular weight homologies, 1,3 diaminopropane, 1,4 diaminobutane, 1,5 diaminopentane, 1,6 diaminohexane, bis-hexanethylenetriamine, N-aminopropylethylenediamine, NN'-diaminopropylethylenediamine, and combinations thereof.

The polyamine employed in the practice of this invention may be a mixture of the compounds described above and may be obtained from commercial sources. An example of a polyamine mixture which is suitable for use in the invention is BHMT (a polyamine blend manufactured by DuPont, Inc.). BHMT is a mixture of polyamines taken from bis-hexamethylene triamine bottoms and contains 20–60% bis-hexamethylene triamine.

The polyamine must be dissolved in an adequate amount of polyglycol solvent prior to its addition to the condensation reaction. It is well within the ability of a skilled artisan to determine the amount of polyglycol solvent necessary to dissolve a given amount of polyamine. Polyglycol solvents which are suitable for use in the invention include, but are not limited to, the following: ethylene glycol, diethylene glycol, propylene glycol, dipropylene glycol and higher molecular weight homologues, and combinations thereof.

The polyamidoamine additive will be incorporated in the cement mix within the range of about 0.025% to 0.25% by weight (based upon the weight of the cement). A preferred amount of the additive is in the range of about 0.075% to 0.15% by weight. The additive of the present invention is preferably incorporated into hydraulic cement mixes by inner grinding the additive with the cement, limestone, and other cement components. However, the additive could be incorporated in any other convenient manner.

The term "fine aggregate" is intended to mean sand or other fine aggregate meeting the requirements of the American Standards for Testing and Material (A.S.T.M.) standard C-33-80. The precise size, purity, quality, and quantity, or ranges thereof, of the fine aggregates will vary depending upon the desired use and properties of the masonry or mortar cements. For most common uses the size of the fine aggregate will be within the broad range of about +4 mesh to −100 mesh U.S. Standard Sieve (A.S.T.M. C-11-70).

For dry mortar mixes, the proportion of fine aggregate to cement will be in the range of about 25% to about 75% by weight (based upon the weight of the cement mix), depending upon the nature of the aggregate and the desired properties and use of the mix.

The amount of water employed to produce the masonry and mortar cements generally should be enough to effect hydraulic setting of the cement present in the mix and to provide suitable workability. This may broadly range from about 20% to 60% by weight of the cement in the mix. The precise amounts of water will depend upon the end use of the cement mix, as well as the aggregate and other admixtures present in the mix.

It is known to skilled artisans that certain specific industry standards have been promulgated for the composition of masonry cements. Therefore, it is preferred to follow these standard cement formulations set forth by the A.S.T.M. (C 91-89) and the International Conference of Building Officials (Uniform Building Code Standard No. 24-19) in practicing the invention.

The following examples are provided to further illustrate the present invention and are not to be construed as limiting the invention in any manner.

EXAMPLE 1

A polyamidoamine cement additive was produced via the following method. To a clean 2 L three-necked flask equipped with a stirrer, thermometer, and reflux condenser with a Dean Stark trap was charged 50 parts by weight of a blend of polyethyleneamines consisting primarily of aminoethylpiperazine and triethylenetetramine and 192 parts by weight of diethylene glycol at room temperature. This mixture was heated to 50°–100° C., at which time 50 parts by weight of an (α-methyl)styrene-acrylic acid copolymer having a molecular weight of between 1,500–1,900 and an acid number of between 230 and 240 was slowly added to the flask with stirring. The mixture was heated at 240°–250° C. for six hours before being allowed to cool, at which time the resulting polyamidoamine (PAA) cement additive product was recovered.

A series of masonry cements were produced for via the following procedure. About 6,000 g of a masonry cement was mixed with about 0.15 wt. % of an additive (see Table I below for types of cements and additives). This mixture was ground in a finish ball mill for 20-30 minutes at a temperature in the range of 225°-275° C. Subsequently, 450 g of the ground mixture, 1440 g of sand, and 210 g of water was added to a Hobart mixer and mixed for about 4 minutes. The resulting mortars were evaluated for air content and bond strength, and the results listed in Table I below.

TABLE I

| MORTAR #[1] | ADDITIVE[2] | % Air[3] | Bond St.[4] | Calculated Bond St.[5] | % Diff.[6] |
|---|---|---|---|---|---|
| 1 | AP 300 | 8.3 | 215 ± 43 | 190 | +13 |
| 2 | AP 200J | 14.6 | 158 ± 38 | 164 | −4 |
| 3 | PAA | 17.1 | 192 ± 24 | 153 | +25 |
| 4 | PAA | 18.0 | 208 ± 24 | 149 | +40 |
| 5 | AP 200J | 14.8 | 150 ± 29 | 163 | −8 |
| 6 | PAA | 15.0 | 188 ± 23 | 159 | +18 |
| 7 | AP 300 | 13.4 | 150 ± 25 | 169 | −11 |
| 8 | PAA | 10.6 | 215 ± 36 | 180 | +19 |
| 9 | PAA | 12.0 | 207 ± 38 | 175 | +18 |

[1]Mortar Nos. 1-4 were made using cement from Holnam Cement Co., Santee, SC. Mortar Nos. 5-9 were made using cement from Medusa Cement Co., Wampum, PA.
[2]AP 200J = AIR PLAS ® 200J (a tall-oil derived fatty acid based cement additive manufactured by Westvaco, Inc.). AP 300 = AIR PLAS ® 300 (a tall-oil derived fatty acid based cement additive manufactured by Westvaco, Inc.).
[3]Air content percentage was determined via the standard A.S.T.M. C 185-88 experimental procedure for measuring air content of mortars. The Uniform Building Code Standard No. 24-19 specifies air contents for various mortars of between 8 to 18%.
[4]Actual bond strength was determined via the standard A.S.T.M. C 1072 experimental procedure for measuring mortar bond strength.
[5]Theoretical bond strength was calculated using the standard equation: [Bond Strength = 16.3 (% Portland Cement) − 4.2 (% Air)].
[6]Percentage difference between measured and theoretical bond strengths.

As shown above, in each instance the mortar containing the PAA additive had an improved bond strength (from 18-40%) versus the predicted (theoretically calculated) bond strength for that mortar. Furthermore, the PAA additive enhanced mortars performed 20% to 30% better than the mortars containing the AIR PLAS additives.

EXAMPLE 2

A polyamidoamine cement additive is produced via the following method. To a clean 2 L three-necked flask equipped with a stirrer, thermometer, and reflux condenser with a Dean Stark trap is charged 50 parts by weight of aminoethylpiperazine and 190 parts by weight of ethylene glycol at room temperature. This mixture is heated to 50°-100° C., at which time 50 parts by weight of an styrene-acrylic acid copolymer having a molecular weight of between 1,000-10,000 and an acid number of between 180 and 240 is slowly added to the flask with stirring. The mixture is heated at 240°-250° C. for six hours before being allowed to cool, at which time the resulting polyamidoamine cement additive product is recovered.

EXAMPLE 3

A polyamidoamine cement additive is produced via the following method. To a clean 2 L three-necked flask equipped with a stirrer, thermometer, and reflux condenser with a Dean Stark trap is charged 50 parts by weight of triethylenetetramine and 192 parts by weight of diethylene glycol at room temperature. This mixture is heated to 50°-100° C., at which time 50 parts by weight of an (α-methyl)styrene-acrylic acid copolymer having a molecular weight of between 1,000-10,000 and an acid number of between 180 and 240 is slowly added to the flask with stirring. The mixture is heated at 240°-250° C. for six hours before being allowed to cool, at which time the resulting polyamidoamine cement additive product is recovered.

Many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. A hydraulic cement mix comprising a hydraulic cement, aggregate in an amount of up to 80 percent by weight based upon the total weight of said cement mix, sufficient water to effect hydraulic setting of the cement, and a polyamidoamine additive comprising the reaction product of:
    (a) a polymerization reaction wherein 1-99% by weight of a member selected from the group consisting of styrene, α-methyl styrene, and combinations thereof is reacted with 1-99% by weight of acrylic acid to produce a copolymer; and
    (b) a further condensation reaction wherein 20-80% by weight of said copolymer is reacted with 20-80% by weight of a polyamine dissolved in a polyglycol solvent to produce the polyamidoamine additive, wherein said polyaminoamine additive is present in an amount sufficient to increase the bonding strength of the hardened cement mix.

2. A hydraulic cement mix in accordance with claim 1, wherein said hydraulic cement comprises portland cement.

3. A hydraulic cement mix in accordance with claim 1, wherein said polyamidoamine additive is present in an amount between about 0.025% and about 0.25% by weight based upon the weight of the cement.

4. A hydraulic cement mix in accordance with claim 1, wherein said polyamidoamine additive is present in an amount between about 0.075% and about 0.15% by weight based upon the weight of the cement.

5. A hydraulic cement mix in accordance with claim 1, wherein said polyamidoamine additive comprises the reaction product of:
    (a) a polymerization reaction wherein 20-80% by weight of a member selected from the group consisting of styrene, α-methyl styrene, and combinations thereof is reacted with 20-80% by weight of acrylic acid to produce a copolymer; and
    (b) a further condensation reaction wherein 30-70% by weight of said copolymer is reacted with 30-70% by weight of a polyamine dissolved in a polyglycol solvent to produce the polyamidoamine additive.

6. A hydraulic cement mix in accordance with claim 1, wherein the copolymer has a molecular weight in the range of 1,000-10,000.

7. A hydraulic cement mix in accordance with claim 1, wherein the polyamine has a molecular weight in the range of 60-1,000.

8. A hydraulic cement mix in accordance with claim 1, wherein the polyamine is selected from the group consisting of: aminoethylethanolamine, aminoethylpiperazine, diethylenetriamine, triethylenetetramine, tetraethylenepentamine, bis-aminopropylamine, pentamethylenediamine, hydroxyethylpiperazine, bis-hexamethylene triamine and higher molecular weight homologies, 1,3 diaminopropane, 1,4 diaminobutane, 1,5 diaminopentane, 1,6 diaminohexane, bis-hexanethylenetriamine, N-aminopropylethylene-diamine, NN'-diaminopropylethylenediamine, and combinations thereof.

9. A hydraulic cement mix in accordance with claim 1, wherein the polyglycol solvent is selected from the group consisting of: ethylene glycol, diethylene glycol, propylene glycol, dipropylene glycol and combinations thereof.

* * * * *